United States Patent [19]

Fourdraine

[11] Patent Number: 4,845,741
[45] Date of Patent: Jul. 4, 1989

[54] MODEM RINGING SUPRESSION CIRCUIT

[75] Inventor: John D. Fourdraine, Toronto, Canada

[73] Assignee: Control Data Corporation, Minneapolis, Minn.

[21] Appl. No.: 186,602

[22] Filed: Apr. 27, 1988

[51] Int. Cl.$^4$ .............................................. H04N 11/00
[52] U.S. Cl. ........................................ 379/98; 379/92; 379/106
[58] Field of Search .................... 379/92, 93, 96, 97, 379/98, 106, 107, 188, 199, 372, 442, 443, 82

[56] References Cited

U.S. PATENT DOCUMENTS

| | | | |
|---|---|---|---|
| 4,203,006 | 5/1980 | Mascia | 379/443 |
| 4,310,724 | 1/1982 | Gonzalez . | |
| 4,513,415 | 4/1985 | Martinez . | |
| 4,524,244 | 6/1985 | Faggin et al. | 379/93 |
| 4,546,382 | 10/1985 | McKenna et al. | 379/92 X |
| 4,567,511 | 1/1986 | Smith et al. . | |
| 4,578,700 | 3/1986 | Roberts et al. | 379/92 X |
| 4,723,267 | 2/1988 | Jones et al. | 379/93 |

*Primary Examiner*—Keith E. George
*Attorney, Agent, or Firm*—Irell & Manella

[57] ABSTRACT

An automatic telecommunication system includes a central location and at least one remote location where a data reporting system including a modem is situated. The central location establishes communications over the switched telephone network to the modem coupled to a telephone line at the remote location. At least one telephones is also connected to the telephone line at the remote location. Circuitry is provided for suppressing ringing of the telephone when the central location initiates a call to the modem at the remote location. The circuitry includes a microprocessor for controlling the modem to respond to incoming ringing signals on the telephone line only during a predetermined time window. The circuitry also includes an arrangement for detecting a ringing signal on the telephone line and delivering an input to the microprocessor indicating ringing. The microprocessor delivers an output if the ringing occurs during the predetermined time window. Circuitry is responsive to the microprocessor output to drive the modem to go off-hook. A circuit driven by the microprocessor establishes a load access the telephone line when the modem goes off-hook for a predetermined time period to essentially short circuit the telephone line for a period of time sufficient to allow ring trip on the telephone line, thereby preventing any ringing of telephones connected to the telephone line.

7 Claims, 2 Drawing Sheets

MODEM RINGING SUPRESSION CIRCUIT

BACKGROUND OF THE INVENTION

This invention pertains to the field of automatic telecommunications devices which operate over telephone lines. More particularly, this invention pertains to the use of automatic telecommunication devices on telephone lines on which normal voice conversations can also occur, and in which ringing, including any abbreviated ringing, of the telephones is inhibited when a connection is made for automatic telecommunications.

There are a large number of applications in which it is desirable to install automatic data collection and reporting devices in a remote unattended site. These devices typically report to a central computer system using some form of telecommunications modem. It is generally more desirable to install this equipment on a switched network telephone line rather than a permanently dedicated leased telephone line. Whenever possible, it is economically preferable to use an existing voice telephone line rather than install a special telephone line for the sole use of this equipment.

However, sharing a telephone line between normal subscriber usage and automatic machine usage can create some special problems. In particular, the presence of the automatic equipment should not impact on normal usage of the telephone line for voice communications. One problem that can and does occur in initiation of automatic telecommunications, in which a central station dials a modem connected to the telephone voice line, is that an abbreviated ringing of the telephones connected to the telephone voice line results. This can occur if the modem does not go off-hook soon enough or if there is a delay in ring trip at the telephone central office after the modem has gone off-hook, which results in abbreviated ringing of telephones on the line.

OBJECTS AND SUMMARY OF THE INVENTION

It is an object of this invention to provide a method and apparatus for use with an automatic telecommunications system which prevents abbreviated ringing of telephones connected to the common telephone system when an automated telecommunications call comes in.

Briefly, in accordance with one embodiment of the invention, there is provided at a remote site a modem and a microprocessor for controlling automatic telecommunications between a central location and the modem. The microprocessor is coupled to a telephone line at the remote site and detects ringing signals on the telephone line. The microprocessor is responsive to detection of the ringing signals to cause the modem to go off-hook. When the modem goes off-hook, means are provided to immediately load the telephone line sufficiently to prevent the ringing signals on the telephone line from ringing any of the telephones connected to the telephone line. This loading of the telephone line is continued for a time period sufficient to allow ring trip at the central office supplying the ringing power on the telephone line.

DETAILED DESCRIPTION

Figure 1:
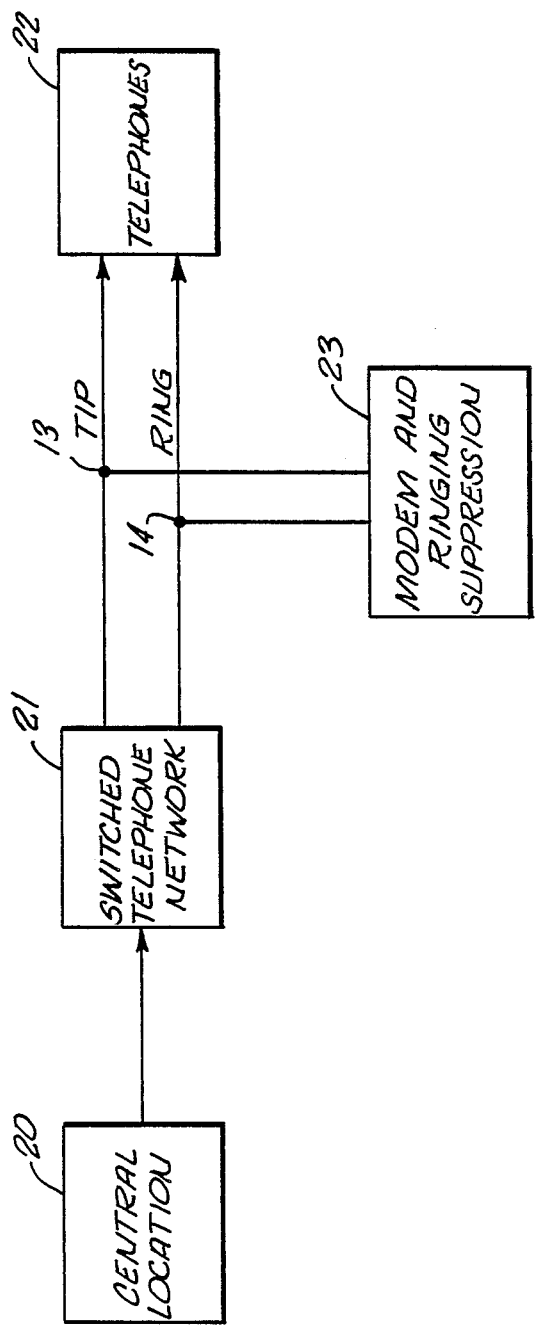
FIG. 1 is an overall block diagram of a system to which the present invention is applicable.

FIG. 1 is an overall block diagram of a system to which the present invention is applicable. Such a system includes a central location 20 coupled to the switched telephone network 21. The switched telephone network terminates in tip and ring terminals 13 and 14 at a particular location, such as a household, and telephones 22 are connected to the tip and ring terminals 13 and 14. In a system to which the present invention is applicable, a modem is also connected to the tip and ring terminals 13 and 14 and includes a modem ringing suppression circuit. The modem and ringing suppression circuit are illustrated by block 23 in FIG. 1.

Figure 2:
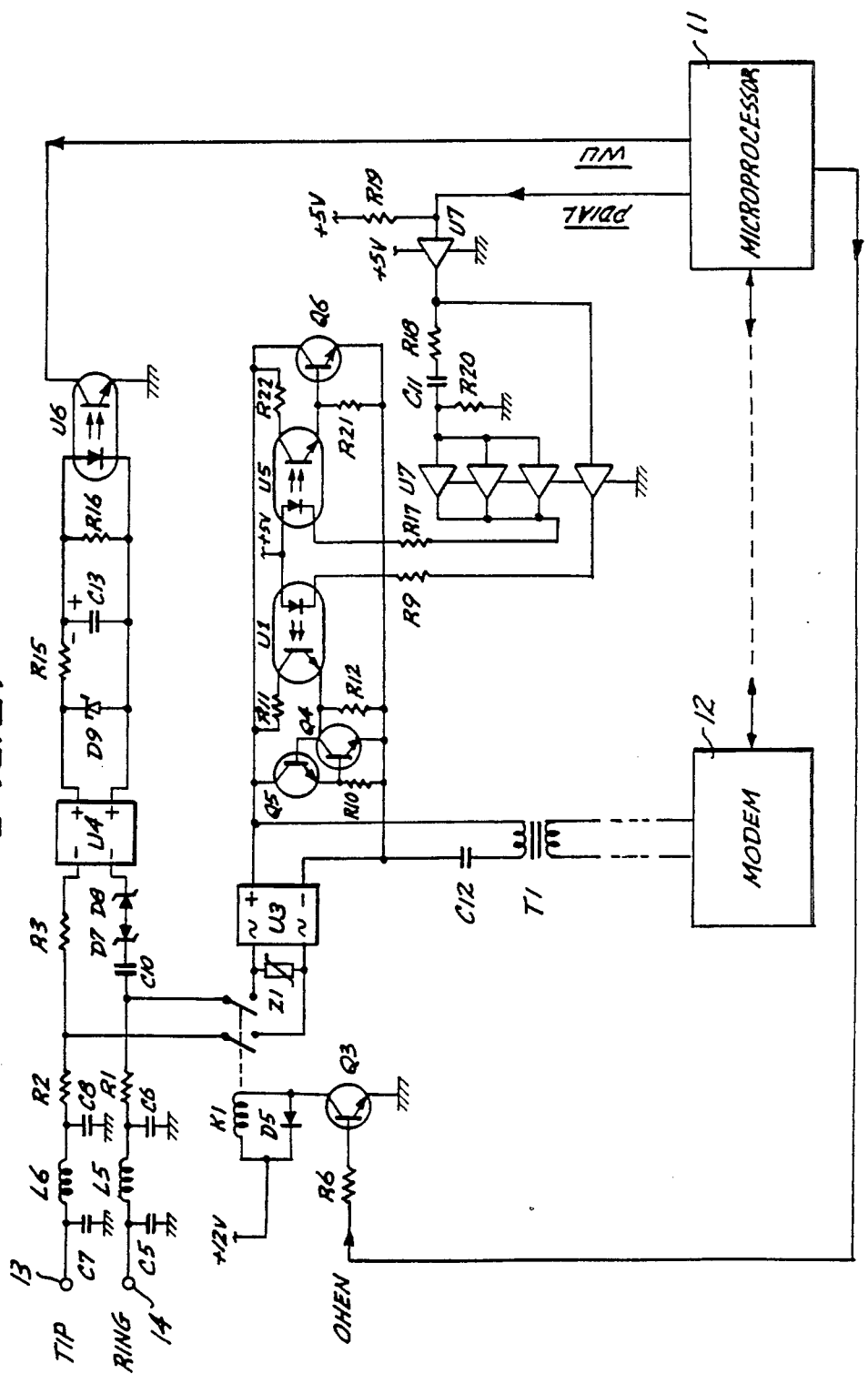
FIG. 2 is a circiut diagram of one embodiment of the invention for preventing ringing of telephones connected to a telephone line during initiation of automatic telecommunications from a central site to a modem coupled to the telephone line at a remote location.

Turning now to FIG. 2, there is illustrated the features of the present invention in accordance with one presently preferred embodiment thereof. The circuit of this invention is under control of a microprocessor 11, which also controls a modem 12. The dotted signal line in the drawing is illustrative of the various interconnections between microprocessor 11 and modem 12 which are not essential to an understanding of the present invention, and hence which are not illustrated in detail. The telephone line in the drawing is illustrated by terminals 13 and 14, which are connected to tip and ring. Of course, one or more conventional telephone handsets (not shown) are also connected to tip and ring since this invention is applicable to settings where there are telephone handsets connected to the telephone line.

In accordance with a preferred embodiment of the invention, the microprocessor 11 is programmed to control modem 12 such that the modem will only respond to ringing on the telephone line to go off-hook for automatic telecommunications with an incoming call from a central location during a predetermined time window. This is useful in minimizing possible interference with normal voice communication use of the telephone line. This predetermined time window can be, for example, a ten minute period between three a.m. and three-ten a.m., a time when it is not likely that there would be incoming voice calls on the telephone line that would be interfered with by the modem going off-hook. This time window can be set in memory of the microprocessor 11, which has a clock. If desired, and in accordance with conventional techniques, the clock in microprocessor 11 can be periodically reset, for example during automatic telecommunications with the central location, to insure that the microprocessor will treat incoming calls as being automatic telecommunications calls during the appropriate predetermined time window. Also in accordance with conventional techniques, the microprocessor may have a backup battery associated with it, so as to retain data such as the time window in the event of a power failure.

A ringing signal between terminals 13 and 14 is first of all passed through a radio frequency intererence filter, illustrated in the drawing as including inductors L5 and L6, and capacitors C5 through C8. The filtered ringing signal is current limited by resistor R3 and capacitor C10 as required while the modem is still off-hook. The Zener diodes D7 and D8 are included in the circuit to insure that any signal passed through to the rest of the circuitry is greater than a set amount, i.e. 51 volts, so that the signal is qualified as an authentic ringing signal.

The ringing energy in the signal is then rectified by U4, which drives an R-C time delay constituted by resistor R15 and capacitor C13, through Zener diode D9. The Zener diode D9 sets a constant voltage, such as 6.8 volts, and resistor R15 and capacitor C13 are selected to provide a suitable time delay, such as 3.5 milliseconds. The purpose of the integration of ringing energy together with the 51 volt qualification, is to insure rejection of pulse noise, such as from dialing, line testing, induction, or natural causes, on the telephone line. The delayed signal is coupled through light emitting diode -phototransistor U6 to signal line WU. In accordance with this particular embodiment of the invention and for normal ringing, U6 is driven for approximately 5-15 milliseconds, which allows U6 to provide a solid output signal on WU for approximately 4-14 milliseconds. Signal line WU is coupled to the microprocessor 11.

The microprocessor recognizes a signal on signal line WU which occurs during the predetermined time window as being ringing indicating an incoming call for automatic telecommunications with the central location. In areas where there is no ringing above 30 Hz, the microprocessor can recognize the signal on WU after 5-10 milliseconds, with no break, as valid ringing. Otherwise, with ringing above 30 Hz, the microprocessor 11 recognizes valid ringing after about 3-5 milliseconds. In any event, after the microprocessor decides that it sees valid ringing on WU, it checks for coincidence with the predetermined time window. If so, the microprocessor immediately actuates the signal lines OHEN and PDIAL.

Actuation of OHEN is coupled through resistor R6 and transistor Q3 to close relay K1. Diode D5 assures positive closing of relay K1. Closure of relay K1 causes the signal between tip and ring of the telephone line to be coupled through to the plus and minus outputs of U3. Z1 protects U3 and the components connected to its plus and minus outputs from any damaging line transients. The plus and minus outputs of U3 are coupled through capacitor C12 to a small coupling transformer T1, which allows audio driving and coupling to the modem 12.

As discussed above, even after the modem 12 goes off-hook, it takes some time for ring trip to occur at the central office supplying the ringing on the telephone line, and this can cause abbreviated ringing on telephones connected to the telephone line. In accordance with the above-described embodiment of the present invention, the modem 12 goes off hook approximately 11 milliseconds after the start of ringing, plus about 2 milliseconds due to the time involved in closing relay K1. This has been experimentally found to be short enough to prevent ringing sound from other telephones connected to the telephone line, if the ring power is loaded down to less than 30 volts until ring-trip in the central office which supplies the ringing power. Ring-trip can occur between 10 and 250 milliseconds after the modem goes off-hook, provided that the telephone line is essentially shorted until ring-trip occurs. The additional circuitry provided by this invention and illustrated in the drawing connected between the plus and minus outputs of U3, functions to load the telephone line, essentially shorting it, for a length of time sufficient to allow ring trip so that there is no ringing on any telephones connected to the telephone line.

In the drawing, the circuitry for loading the telephone line until ring trip occurs is connected to the plus and minus outputs of U3. The transistor Q6 and its related components resistors R17, R21, R22, light emitting diode phototransistor U5, buffer U7, capacitor C11, and resistors R18 and R20 fulfill the requirement of shorting the telephone line until ring trip. The PDIAL signal drives the light emitting diode of U5 through buffer U7 and the RC circuit of resistor R20 and capacitor C11. In accordance with this particular embodiment of the invention, the buffer U7 with its RC circuit serves as a 400 millisecond one-shot. The phototransistor of U5 is coupled via resistors R21 and R22 across the transistor Q6. Depending upon the characteristics of the telephone line and the central office supplying the ringing power, the time constant of resistor R20 and capacitor C11 can be adjusted to insure clamping of transistor Q6 until ring trip occurs. In this particular embodiment, transistor Q6 saturates at approximately 10-15 volts at 300 milliamps. Current is limited by resistors R1, R2, and the telephone line resistance. The voltage drop across resistor R1, resistor R2, U3 and Q6 (5 volts minimum in accordance with this particular embodiment) insures sufficient voltage on the telephone line for memory retention in any electronic telephones connected to the same telephone line. After time out of the RC circuit formed by R20 and C11, transistor Q6 becomes an open circuit, which leaves only transistor Q5 and its related components to maintain the off-hook condition.

Transistors Q5 and Q4, together with resistor R10, form a constant - current sink, set in accordance with this particular embodiment at 28 milliamps. This constant current sink is switched on or off by light emitting diode phototransistor U1, resistors R9, R11 and R12, and PDIAL, as long as OHEN is actuated. Being a constant - current sink, the resulting shunt impedance is high, mainly set by resistor R11. This permits the audio driving and termination via the small coupling transformer T1 and D.C. blocking capacitor C12.

The arrangement described above in connection with illustration of one embodiment of the invention is adequate to prevent any ringing from a properly designed telephone in connection with incoming calls for automatic telecommunications with a modem. Specifically, incoming ringing is suppressed to less than 15-20 volts after a programming delay of about 10-20 milliseconds after the first time the ringing reaches a 60 volt amplitude. However, there are in reality various poorly designed telephones on the market, often at very low cost, with might still have a possibility of ringing, and indeed often ring during dialing of another telephone connected to the line. Adjustments are possible to eliminate even this ringing. For example, the detection of WU can be speeded up by omitting capacitor C13 from the circuitry described above. As another example, the microprocessor response can be speeded up so that it responds to WU in about 1 millisecond. As another example, a relay K1 can be selected which has a faster response, on the order of 0.3 milliseconds. If all of these exemplary steps are taken, the delay to clamping ring can be reduced to about 3 milliseconds after ringing reaches 60 volts. This will suppress ringing of even poorly desgined telephones, at the cost of the modem perhaps going off - hook too often. In such cases, however, the time window during which WU is acted upon can be narrowed, thus minimizing any uncertainty as to the modem going off - hook.

It should be clear that various modifications to the specific embodiments of the invention disclosed herein are possible and will occur to those skilled in this art, but that those modifications are clearly within the scope of the present invention. It is intended in the appended claims to define the scope to which the present invention is entitled.

I claim:

1. In an automatic telecommunications system including a central location and at least one remote location and wherein a data reporting system including a modem is situated at the remote location for communications with the central location over the switched telephone network via a telephone line at the remote location to which at least one telephone is also connected, the improvement for suppressing ringing of the at least one telephone when the central location initiates a call to the modem at the at least one remote location comprising a microprocessor for controlling the modem to respond to incoming ringing signals on the telephone line only during a predetermined time window, means for detecting a ringing signal on the telephone line and delivering an input to the microprocessor indicating ringing, whereby the microprocessor delivers an output if the ringing occurs during the predetermined time window, means responsive to the microprocessor output to drive the modem to go off - hook, means driven by the microprocessor for establishing a load across the telephone line when the modem goes off - hook for a predetermined time period to essentially provide short circuiting of the telephone line for a limited period of time sufficient to allow ring trip on the telephone line, followed by normal off - hook loading of the telephone line during data communications, thereby preventing any ringing of telephones connected to the telephone line.

2. Apparatus in accordance with claim 1 wherein said means for establishing a load across the telephone line to essentially provide short circuiting of the telephone line comprises a transistor coupled to the microprocessor through an RC network, functioning to limit the essentially short circuiting of the telephone line when the modem goes off hook to a period of time determined by the time constant of the RC network.

3. Apparatus in accordance with claim 2 wherein said means for detecting a ringing signal on the telephone line and delivering an input to the microprocessor includes filter means for filtering noise and transients on the telephone line to prevent erroneous indications of ringing to the microprocessor.

4. Apparatus in accordance with claim 3 wherein said means for detecting a ringing signal on the telephone line and delivering an input to the microprocessor also includes Zener diode means for only delivering an input indicating ringing to the microprocessor in response to signals above a predetermined voltage level on the telephone line.

5. Apparatus in accordance with claim 4 wherein said means for detecting a ringing signal on the telephone line and delivering an input to the microprocessor also includes integration means, so that pulse noise on the telephone line is inhibited from being recognized as ringing signals.

6. Apparatus in accordance with claim 2 including a constant current sink connected across the telephone line when the modem goes off - hook to provide a high shunt impedance, and coupling transformer means connected in parallel with said constant current sink for coupling the telephone line to the modem.

7. In an automatic telecommunication method of operating a system including a central location and at least one remote location wherein a data reporting system including a modem is situated at the remote location for communications with the central location over the switched telephone network via a telephone line at the remote location to which at least one telephone is also connected, the improvement in a method for suppressing ringing of the at least one telephone when the central location initiates a call to the modem at the at least one remote location comprising the steps of providing a microprocessor for controlling the modem to respond to incoming ringing signals on the telephone line only during a predetermined time window, detecting a ringing signal on the telephone line and delivering an input to the microprocessor indicating ringing, whereby the microprocessor delivers an output if the ringing occurs during the predetermined time window to drive the modem off - hook, establishing a load across the telephone line when the modem goes off - hook with the load being established for a predetermined time period to essentially provide short circuiting of the telephone line for a limited period of time sufficient to allow ring trip on the telephone line, followed by normal off - hook loading of the telephone line during data communications, thereby preventing any ringing of telephones connected to the telephone line.

* * * * *